United States Patent
Chiang

(10) Patent No.: US 7,027,451 B1
(45) Date of Patent: Apr. 11, 2006

(54) DYNAMIC BREAK LOOP FOR CLOSED LOOP UNMANAGED STACKING SWITCHES

(75) Inventor: Mark Chiang, Fremont, CA (US)

(73) Assignee: LSI Logic Corporation, Milpitas, CA (US)

( * ) Notice: Subject to any disclaimer, the term of this patent is extended or adjusted under 35 U.S.C. 154(b) by 746 days.

(21) Appl. No.: 09/872,246

(22) Filed: May 31, 2001

(51) Int. Cl.
*H04L 12/28* (2006.01)

(52) U.S. Cl. ............... 370/404; 370/248; 370/250; 370/258; 370/402; 370/406; 370/231; 709/224

(58) Field of Classification Search ............... 370/254, 370/255, 257, 258, 465, 402, 404, 406, 410
See application file for complete search history.

(56) References Cited

U.S. PATENT DOCUMENTS

| | | | | |
|---|---|---|---|---|
| 5,469,446 A | * | 11/1995 | Fuhs et al. ............... | 714/749 |
| 5,802,042 A | * | 9/1998 | Natarajan et al. ............ | 370/255 |
| 6,278,695 B1 | * | 8/2001 | Christensen et al. ......... | 370/254 |
| 6,359,886 B1 | * | 3/2002 | Ujihara et al. ............... | 370/392 |
| 6,404,744 B1 | * | 6/2002 | Saito ............................ | 370/255 |
| 6,430,183 B1 | * | 8/2002 | Satran et al. ................ | 370/389 |
| 6,430,409 B1 | * | 8/2002 | Rossmann ................ | 455/422.1 |
| 6,728,220 B1 | * | 4/2004 | Behzadi ....................... | 370/254 |
| 6,891,844 B1 | * | 5/2005 | Ueno ........................... | 370/410 |

* cited by examiner

*Primary Examiner*—Dang Ton
*Assistant Examiner*—Jay P. Patel
(74) *Attorney, Agent, or Firm*—Thelen Reid & Priest LLP

(57) ABSTRACT

A dynamic break loop capable closed loop network having a plurality of switches and links. Each switch has two uplink ports that each have a set of dynamic break loop logic functions that may be enabled or disabled. The dynamic functions include inserting an ID number of a source switch into each frame that is transmitted from the switch, enabling a transmit function of each uplink port to monitor the ID number of each frame, and enabling a receive function of each uplink port to monitor the ID number of each frame. If the ID number is not equal to a filter ID number, then the frame will pass unchanged. If the ID number is equal to the filter ID number, then the frame will be cut off and will not be allowed to pass. The dynamic functions create a dynamic break for each switch in the network. The result is a closed loop network that operates dynamically as a plurality of open loop networks.

11 Claims, 2 Drawing Sheets

DYNAMIC BREAK LOOP FOR CLOSED LOOP UNMANAGED STACKING SWITCHES

FIELD OF THE INVENTION

The present invention relates generally to electronic Ethernet networks. More specifically, the present invention relates to unmanaged stacking switches in an Ethernet network.

BACKGROUND OF THE INVENTION

Soon after the invention of the computer, people began connecting computers together into networks. This allows for the sharing of information and resources within the network. To save on resources, rather than connect each computer to every other computer in the network, a common communication path is established. The network is designed to a standard for physical resources and communication protocols. In addition to the computers themselves, other equipment may be connected to the network. This equipment may include printers, plotters, modems, memory storage devices, and the like. Each piece of equipment is referred to as a node of the network. Each node is connected to a switch which controls access to the network. The switches each have two uplink ports, that is, port A and port B. Each uplink port is connected to a link of the network. The information or data that is shared over the network is broken into packets or frames for transmission over the network. The size and content of the packet will depend on the communications protocol that is being used. One common network standard is the IEEE 802.3 Ethernet standard. Under this standard, a frame consists, in order, of six bytes of a destination address (DA), six bytes of a source address (SA), a payload, and a four byte Cyclic Redundancy Check (CRC) value. The total packet length can be from 64 to 1,518 bytes long with all but sixteen of the bytes consisting of the payload.

There are two conventional techniques for connecting the switches of a network. The first is to connect them one to one to form a closed loop or ring. To allow for a closed loop system, a management device is required. Otherwise, there is a chance that a packet may never reach its destination address and travel forever on the loop. This would result in degraded performance of the network. The management device is usually a computer running a management software such as a spanning tree algorithm. This results in extra cost and complication.

A second simpler technique for connecting the switches of a network is to leave one of the links open in the closed loop above, thus forming an open loop or chain. This eliminates the possibility of a packet traveling in an infinite loop and eliminates the expense of a management device. However it can result in other shortcomings. First, it is desirable to minimize the latency of any network, that is, the maximum number of links between the ends of the network. For conventional open loop networks, the latency is the number of switches in the stack minus one. For example, a stack of four switches has a latency of four minus one equals three. Second, it is desirable to balance the traffic load among the links of any network. In an open loop network, the links near the center of the chain will carry a greater load than the links near the end of the chain by design. This heavy loading may reduce the performance of the network. Third, it is desirable to design a robust network. Should a single failure occur, the rest of the network should remain as functional as possible. In an open loop network, if, near the center of the chain, one of the links becomes broken or one of the switches malfunctions, then the network becomes isolated into two portions with no communication between the two.

A definite need exists for a dynamic break loop that combines the simplicity of the conventional open loop network without the shortcomings. Specifically, a need exists for a dynamic break loop which is capable of providing improved latency, better load balance, and greater resiliency to failure. Ideally, such a dynamic break loop would be simple, robust, and inexpensive. A primary purpose of the present invention is to solve these needs and provide further, related advantages.

BRIEF DESCRIPTION OF THE INVENTION

A dynamic break loop capable closed loop network having a plurality of switches and links is disclosed. Each switch has two uplink ports that each have a set of dynamic break loop logic functions that may be enabled or disabled. The dynamic functions include inserting an ID number of a source switch into each frame that is transmitted from the switch, enabling a transmit function of each uplink port to monitor the ID number of each frame, and enabling a receive function of each uplink port to monitor the ID number of each frame. If the ID number is not equal to a filter ID number, then the frame will pass unchanged. If the ID number is equal to the filter ID number, then the frame will be cut off and will not be allowed to pass. The dynamic functions create a dynamic break for each switch in the network. The result is a closed loop network that operates dynamically as a plurality of open loop networks.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of a dynamic break loop for closed loop unmanaged stacking switches. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the specific goals of the developer, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

According to the present invention, a closed loop network is configured to dynamically break the loop to form an open loop network. The dynamic break is as opposed to the fixed break of the conventional open loop network. The location of the dynamic break will be relative to each switch in the network. In general, the dynamic break will be located as far away from each switch as possible.

Figure 1:
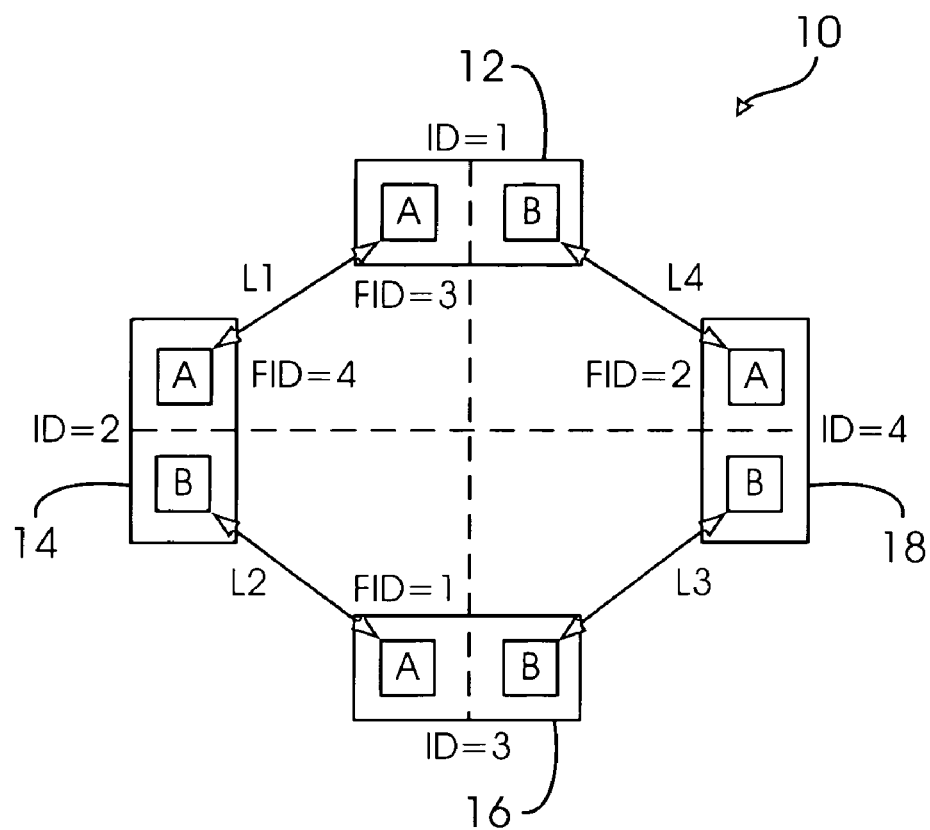
FIG. 1 is a block diagram of a dynamic break loop capable closed loop network having an even number of switches.

Turning first to FIG. 1, a block diagram of a dynamic break loop capable closed loop network 10 having an even number of switches, in this case four switches 12, 14, 16, 18, is shown. The present invention will function on a network having any number of switches, but there is a slight variation between a network having an even number of switches and one having an odd number of switches. The case of a network having an odd number of switches will be outlined below. In the present case, the network has symmetry in two directions as demonstrated by the dashed lines. Each switch has two uplink ports labeled A and B. Each uplink port is connected to another uplink port by a link. Here there are four links labeled L1, L2, L3, and L4 for reference purposes. How the links are connected, that is, A to A, A to B, or B to B, is not important but it will impact the configuration of the network. According to the present invention, each switch is assigned a unique identification (ID) number. Here a first switch 12 has been assigned ID number 1. Likewise, the second, third, and fourth switches 14, 16, 18 have been assigned ID numbers 2, 3, and 4, respectively. In this case, the links and switches are labeled and assigned in a sequential counter clockwise manner, but this will not necessarily be the case so long as each number is unique. The ID assignment process may be manual or automated.

After the assignment of the ID numbers to the switches, each switch must identify which other switch in the loop is the farthest switch from it. Put differently, the farthest switch is the one that takes the most links to reach in either direction. For the case of a network having an even number of switches, the number of links to the farthest switch will be equal in both directions. The farthest switch is referred to by a filter ID (FID). For example, the switch that is farthest from the first switch 12 with ID 1 is the third switch 16 with ID 3. There are two links in either direction. As a result, the FID for the first switch 12 is number 3 as shown. In a similar manner, the FID for the other three switches 14, 16, 18 are 4, 1, and 2, respectively.

The uplink ports A and B of a conventional switch have a prescribed set of logic functions. For the present invention, these functions will remain the default functions unless a set of dynamic break loop logic functions are enabled. These dynamic functions may be integrated into the uplink ports or added externally. First, each frame that is transmitted from a switch will have inserted into it the ID number of the source switch. Preferably, the ID is inserted into the frame after the SA field and is referred to as the ID field. Second, the transmit function of each uplink port should be able to monitor the ID field of each frame. If the number in the ID field is not equal to the FID number, then the frame will pass unchanged. If the number in the ID field is equal to the FID number, then the frame will be cut off and will not be allowed to pass. Third, the receive function of each uplink port should likewise be able to monitor the ID field of each frame. If the number in the ID field is not equal to the FID number, then the frame will pass unchanged. If the number in the ID field is equal to the FID number, then the frame will be cut off and will not be allowed to pass.

Depending on the layout and number of switches in the network, one or both of the uplink ports for a particular switch may have their dynamic functions enabled. Ordinarily, only one uplink port per switch will have its dynamic functions enabled. For a network having an even number of switches, which ports are enabled can be determined through the use of a session dividing line, that is, a centerline. One draws a centerline through the network dividing the corresponding farthest switches in two. A first session is formed on one side of the centerline and a second session is formed on the other side. One then enables the dynamic functions of both uplink ports of the divided farthest switches on one side of the centerline and disables the dynamic functions of both uplink ports on the other side. This is repeated for each pair of farthest switches in the network. This completes the configuration of the network for dynamic break loop operation.

Applying this technique to the network 10 as shown in FIG. 1, one first draws a centerline through the first and third switches 12 and 16. This is shown as a dashed line. Then one chooses to enable the dynamic functions of uplink port A or uplink port B. Here one chooses uplink port A of both switches. Then one draws a second centerline through the second and fourth switches 14 and 18. Here again one chooses to enable the dynamic functions of uplink port A for both switches. As a result, each uplink port A is enabled and each uplink port B is disabled in the network 10. This result is not required for the invention to perform properly, it is just convenient for discussion purposes. In FIG. 1, the corresponding FID for the each enabled uplink port is written next to it for easy reference.

With the configuration complete, each switch in the network has to learn the layout of the network. This is accomplished by having each switch send out a broadcast packet to learn the network 10. For example, assume that a broadcast packet is sourced from the first switch 12 having ID number 1. The packet will be broadcast from both uplink ports A and B. The frame will include the number 1 in the ID field. From uplink port A, the packet will reach uplink port A of the second switch 14 having ID number 2. The uplink port A of the second switch 14 will pass the packet to uplink port B because the ID field of 1 is not equal to the FID of 4. The uplink port B of the second switch 14 will pass the packet on to the uplink port A of the third switch 16 because the dynamic logic has been disabled in the uplink port B. The uplink port A in the third switch 16 will cut off the packet because the ID field of 1 is equal to the FID of 1. The packet then becomes a fragment in the uplink port B of the second switch 14 and is discarded. Similarly, from uplink port B the first switch 12, the packet will reach uplink port A of the fourth switch 18 having ID number 4. The uplink port A of the fourth switch 18 will pass the packet to uplink port B because the ID field of 1 is not equal to the FID of 2. The uplink port B of the fourth switch 18 will pass the packet on to the uplink port B of the third switch 16 because the dynamic logic has been disabled in the uplink port B. Likewise, the uplink port B of the third switch 16 will pass the packet to the uplink port A because the dynamic logic has been disabled in the uplink port B. The uplink port A in the third switch 16 will cut off the packet because the ID field of 1 is equal to the FID of 1. The packet then becomes a fragment in the uplink port B and is discarded. The result is that the link L2 is dynamically broken for the first switch 12.

Further, it can be shown that the link L3 is dynamically broken for the second switch 14, that the link L4 is dynamically broken for the third switch 16, and that the link L1 is dynamically broken for the fourth switch 18. Upon learning this layout, each switch 12, 14, 16, 18 will act accordingly, that is, as though each is in an open loop network with a different open link for each switch.

In comparison to the conventional closed loop network, the dynamic break loop capable closed loop network is less expensive and complicated because there is no need for the management device. Similarly, in comparison to the conventional open loop network, the dynamic break loop capable closed loop network exhibits enhanced performance. First, the latency is improved. Whereas for a four switch system the latency of the conventional open loop network is three, for the dynamic break loop capable closed loop network, the latency is two. This is because the farthest switches are never on the extreme ends of the chain. Second, the load balance is better. This is because there is not a fixed break for all of the switches. The dynamic break is different for each switch and thus there is not really a fixed center link of the chain to become overloaded. Third, the dynamic break loop capable closed loop network is more robust than the conventional open loop network. If there is a single failure of a link or a switch, the dynamic break loop capable closed loop network simply defaults to the conventional open loop network logic functions. In this way, the network does not become isolated into two portions with no communication between the two.

Figure 2:
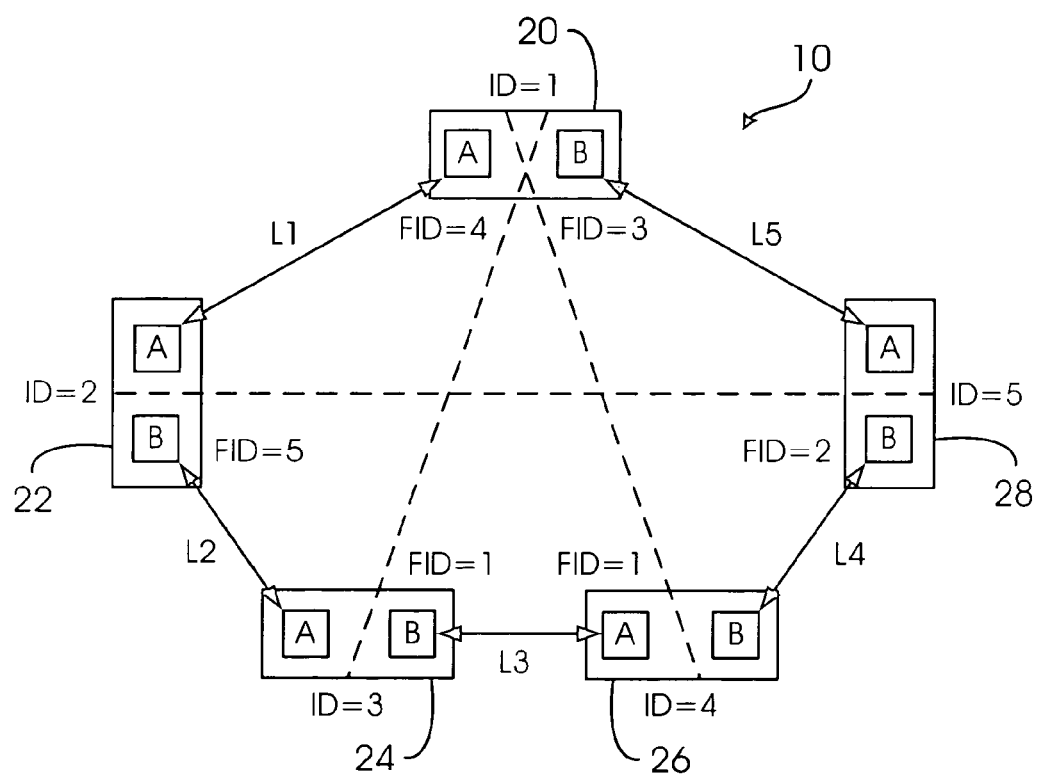
FIG. 2 is a block diagram of a dynamic break loop capable closed loop network having an odd number of switches.

Turning now to FIG. 2, a block diagram of a dynamic break loop capable closed loop network 10 having an odd number of switches, in this case five switches 20, 22, 24, 26, 28, is shown. The addition of one switch to the network of FIG. 1 results in a slight variation. As above, each switch is assigned a unique ID number. Here a first switch 20 has been assigned ID number 1. Likewise, the second, third, fourth, and fifth switches 22, 24, 26, 28 have been assigned ID numbers 2, 3, 4, and 5, respectively. Again the links have been labeled L1, L2, L3, L4, and L5 as shown for reference purposes. The variation comes from the fact that the network having an odd number of switches does not have the symmetry of the network having an even number of switches as above. This complicates the identification of the farthest switches and the enabling of the dynamic functions. To avoid this complication, for configuration purposes one of the switches is selected to represent two switches with one uplink port for each switch. The result is that the network is treated something like it has six switches, that is, an even number. For example, assume that the first switch 20 having ID number 1 represents two switches with one switch having uplink port A and the second switch having uplink port B. Any one of the five switches could have been chosen. Then the techniques outlined above are applied in a similar manner.

With this assumption in place, again each switch must identify which other switch in the loop is the farthest switch from it. Since the first switch 20 is treated as being two switches, it will have two farthest switches. The farthest switch from uplink port A is the fourth switch 26 having ID number 4. While the farthest switch from uplink port B is the third switch 24 having ID number 3. Consequently, for the first switch 20, the FID for uplink port A is 4 and the FID for uplink port B is 3. The other four switches each have only one farthest switch as above. So, the FID for the other four switches 22, 24, 26, and 28 are 5, 1, 1, and 2, respectively.

As above with a network having an even number of switches, which ports are enabled can be determined through the use of a session dividing line. In this case however, one switch will be divided by two session lines. Here this is the first switch 20 as one has assumed it to represent two switches. These session dividing lines are shown as dashed lines. There are three session pairs. In a first session pair, uplink port A of the first and fourth switches 20, 26 is enabled. In a second session pair, uplink port B of the first and the third switches 20, 24 is enabled. In the first and second session pairs there is no real choice of sessions as there is only one uplink port to choose from in the first switch 20 for each session pair. In a third session pair, uplink port B of the second and fifth switches 22, 28 is enabled. It is important to note that the result is that both uplink ports of the first switch 20 are enabled. As above, the corresponding FID for the each enabled uplink port is written next to it for easy reference.

With the configuration complete, again each switch in the network has to learn the layout of the network. In this case, the first switch 20 will have to learn two layouts, that is, one for uplink port A and one for uplink port B. By design, for both uplink ports of the first switch 20, the link L3 will be dynamically broken. Further, it can be shown that the link L4 is dynamically broken for the second switch 22, that the link L5 is dynamically broken for the third switch 24, that the link L1 is dynamically broken for the fourth switch 26, and that the link L2 is dynamically broken for the fifth switch 28. As above, upon learning this layout, each switch 20, 22, 24, 26, 28 will act accordingly, that is, as though each is in an open loop network with a different open link for each switch.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

The invention claimed is:

1. A dynamic break loop capable closed loop network comprising:
    a plurality of switches wherein each switch has two uplink ports and each uplink port has a set of dynamic break loop logic functions; and
    a plurality of links connecting the plurality of switches into a closed loop,
    wherein the set of dynamic break loop logic functions enables the network to operate dynamically as a plurality of open loop networks using an ID number and a filter ID number set for each of the plurality of switches, wherein the filter ID number is set based on at least one farthest switch in the network from each of the plurality of switches.

2. The network as defined in claim 1, wherein the set of dynamic break loop logic functions are capable of being enabled or disabled.

3. The network as defined in claim 2, wherein the set of dynamic break loop logic functions comprise:
    means for inserting the ID number of a source switch into each frame that is transmitted from the switch;
    means for enabling a transmit function of each uplink port to monitor the ID number of each frame; and
    means for enabling a receive function of each uplink port to monitor the ID number of each frame.

4. The network as defined in claim 3, wherein the set of dynamic break loop logic functions further comprises:
   means for determining whether the ID number is not equal to the filter ID number, then the frame will pass unchanged; and
   means for determining whether the ID number is equal to the filter ID number, then the frame will be cut off and will not be allowed to pass.

5. A switch for a dynamic break loop capable closed loop network, the switch comprising:
   two uplink ports; and
   a set of dynamic break loop logic functions provided for the uplink ports that enables the network to operate dynamically as a plurality of open loop networks using an ID number and a filter ID number set for each of a plurality of switches, wherein the filter ID number is set based on at least one farthest switch in the network from each of the plurality of switches.

6. The switch as defined in claim 5, wherein the set of dynamic break loop logic functions are capable of being enabled or disabled.

7. The switch as defined in claim 6, wherein the set of dynamic break loop logic functions comprise:
   means for inserting the ID number of a source switch into each frame that is transmitted from the switch;
   means for enabling a transmit function of each uplink port to monitor the ID number of each frame; and
   means for enabling a receive function of each uplink port to monitor the ID number of each frame.

8. The switch as defined in claim 7, wherein the set of dynamic break loop logic functions further comprises:
   means for determining whether the ID number is not equal to the filter ID number, then the frame will pass unchanged; and
   means for determining whether the ID number is equal to the filter ID number, then the frame will be cut off and will not be allowed to pass.

9. A method of dynamically breaking a closed loop network, the network having a plurality of switches wherein each switch has two uplink ports and having a plurality of links connecting the plurality of switches into a closed loop, the method comprising:
   inserting an ID number of a source switch into each frame that is transmitted from the switch;
   enabling a transmit function of each uplink port to monitor the ID number of each frame;
   enabling a receive function of each uplink port to monitor the ID number of each frame;
   determining whether the ID number is not equal to a filter ID number, then the frame will pass unchanged; and
   determining whether the ID number is equal to the filter ID number, then the frame will be cut off and will not be allowed to pass.

10. A method of configuring a dynamic break loop capable closed loop network having a plurality of switches wherein each switch has two uplink ports and each uplink port has a set of dynamic break loop logic functions and having a plurality of links connecting the plurality of switches into a closed loop, wherein the set of dynamic break loop logic functions enables the network to operate dynamically as a plurality of open loop networks, the method comprising:
   assigning a unique identification number to each of the plurality of switches;
   determining at least one farthest switch in the network from each of the plurality of switches;
   assigning a filter identification number to each of the plurality of switches based on said determining; and
   enabling the set of dynamic break loop logic functions in at least one of the uplink ports in each of the plurality of switches, the set of dynamic break loop logic functions using the unique identification number and the filter identification number.

11. An apparatus for configuring a dynamic break loop capable closed loop network having a plurality of switches wherein each switch has two uplink ports and each uplink port has a set of dynamic break loop logic functions and having a plurality of links connecting the plurality of switches into a closed loop, wherein the set of dynamic break loop logic functions enables the network to operate dynamically as a plurality of open loop networks, the apparatus comprising:
   means for assigning a unique identification number to each of the plurality of switches;
   means for determining at least one farthest switch in the network from each of the plurality of switches;
   means for assigning a filter identification number to each of the plurality of switches based on said at least one farthest switch; and
   means for enabling the set of dynamic break loop logic functions in at least one of the uplink ports in each of the plurality of switches, the set of dynamic break loop logic functions using the unique identification number and the filter identification number.

* * * * *